WILLIAM N. MACQUEEN.

Improvement in Apparatus for Extracting Marrow from Hams.

No. 125,062.                                   Patented March 26, 1872.

WITNESSES:          INVENTOR:
Robert Burns        Wm. N. Macqueen
J. W. Herthel   per Herthel and Co.
                    Attorneys.

UNITED STATES PATENT OFFICE.

WILLIAM N. MACQUEEN, OF ST. LOUIS, MISSOURI.

IMPROVEMENT IN APPARATUS FOR EXTRACTING MARROW FROM HAMS.

Specification forming part of Letters Patent No. 125,062, dated March 26, 1872.

*To all whom it may concern:*

Be it known that, WILLIAM N. MACQUEEN, of St. Louis, in the county of St. Louis and State of Missouri, have invented certain new and useful Improvements in Apparatus for Extracting Marrow from Hams, &c.; and I do hereby declare that the following is a full and true description thereof, reference being had to the accompanying drawing and to the letters of reference marked thereon.

It is well known that in the usual manner of curing hams, &c., the marrow is allowed to remain in the shank-bone; and that, furthermore, the marrow, becoming sour in hot weather, passes through the bone and permeates and taints the ham. The object of this invention is, therefore, to completely extract the marrow from the shank-bone to insure a perfect cure of the ham. To accomplish the said object the nature hereof relates chiefly in the use and process of forcing a current of steam into the shank-bone of hams, in manner now to be more fully described.

To enable those herein skilled to make and use my said improvement, I will now more fully describe the same, referring to the accompanying—

Figure 1:
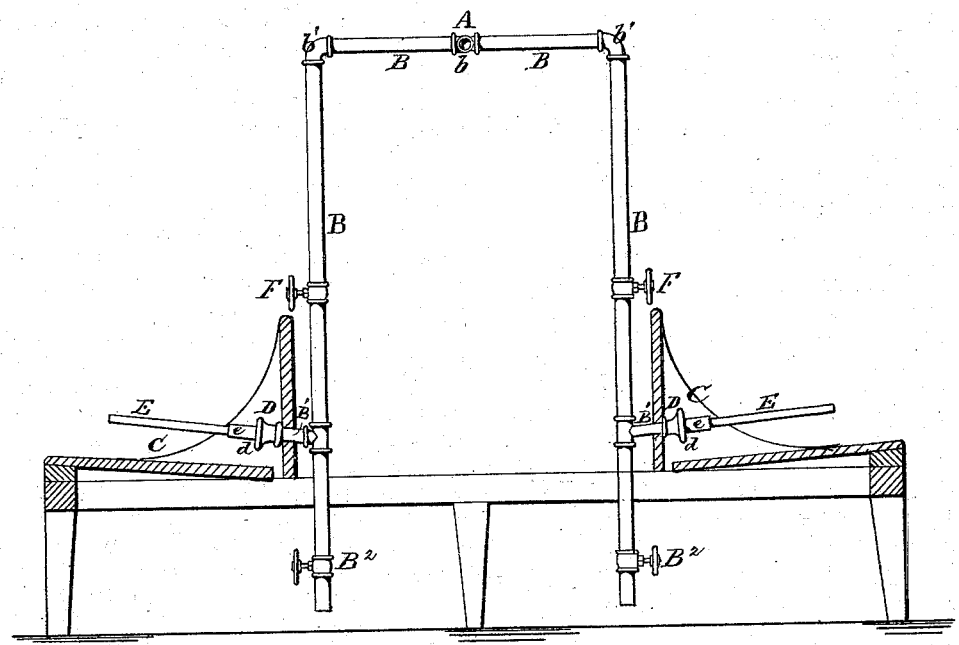
Figure 2:
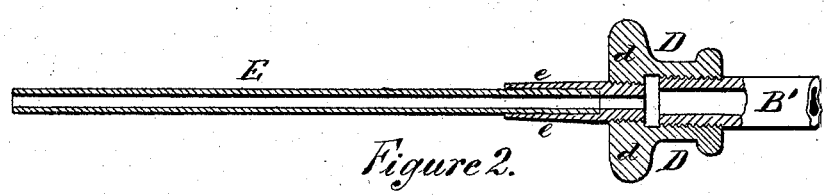

Figure 1, as a sectional elevation; to Fig. 2, as an enlarged detail section of jet-tube and its connections with steam-pipes.

To the pipe A, leading from the steam source, is connected branch steam or gas pipes B, which can be arranged in any desired manner to accommodate. Thus, as represented in Fig. 1, the branch pipe B connects, by proper steam-joints $b$ and elbow-joints $b'$, to either side of main steam-pipe A. Near the lower end of the branch pipes B the branches $B^1$ are connected, and partly project through the side of a suitable bench, C, as shown in Fig. 1. The said branch pipe B, at its lower end, is provided with a proper "blow-off" cock, $B^2$, see Fig. 1. To each of said branch pipes $B^1$ is screwed a socket-head, D, having enlarged face flanges $d$, against which the ham bone abuts when placed on the jet-tube E. The tube E is brazed or secured steam-tight in a proper bushing, $e$, screwed into the socket-heads D of the pipes B, as clearly shown in detail, Fig. 2. The top of the bench C is provided with an opening or slot, $c$, through which the marrow and drippings fall into a tub or barrel. Each branch pipe B is furthermore provided with a suitable check or stop-valve, F, to "let on" or "shut off" steam, as required.

The marrow bone of the ham is thrust by the operator upon the jet-tube E, which, being hot, readily enters the marrow bone. The valve F is then "turned on" to allow the steam by its force and heat to completely extract the marrow out of the marrow bone. The extraction of the marrow is thus achieved in a more perfect and reliable manner, and with greater dispatch than by gouging, as hitherto accomplished. Also, it is apparent that by this process the pickle matter, in which the ham is cured, is allowed to strike and permeate the main joint of the ham, curing the bone, and insuring a more perfect cure of the ham.

Having thus fully described my invention, what I claim, and desire to secure by Letters Patent, is—

1. The process of forcing a direct current of steam, hot water, or hot-air blast into the shank or marrow bones of hams, &c., substantially as and for the purpose set forth.

2. The arrangement of the jet-pipe E, socket-head D, with steam-pipes B $B^1$, and bench C, as and for the purpose set forth.

In testimony of said invention I have hereunto set my hand.

WM. N. MACQUEEN.

Witnesses:
 JAMES I. BUSBY,
 BENNEVILLE KLINE.